(12) United States Patent
Kawashima et al.

(10) Patent No.: US 8,693,099 B2
(45) Date of Patent: Apr. 8, 2014

(54) ANTIREFLECTION FILM

(75) Inventors: Toshitaka Kawashima, Kanagawa (JP); Shigeo Kubota, Kanagawa (JP); Naoya Eguchi, Kanagawa (JP); Koichi Tatsuki, Kanagawa (JP); Junichi Ohsako, Tokyo (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 1193 days.

(21) Appl. No.: 11/782,395

(22) Filed: Jul. 24, 2007

(65) Prior Publication Data

US 2008/0024867 A1 Jan. 31, 2008

(30) Foreign Application Priority Data

Jul. 28, 2006 (JP) .................................. 2006-205518

(51) Int. Cl.
*G02B 1/10* (2006.01)
(52) U.S. Cl.
USPC ............................ 359/585; 359/586; 359/589
(58) Field of Classification Search
USPC ........................................................ 359/585
See application file for complete search history.

(56) References Cited

U.S. PATENT DOCUMENTS

| | | | |
|---|---|---|---|
| 4,314,262 A * | 2/1982 | Reilly | 346/135.1 |
| 4,381,883 A * | 5/1983 | Yamamoto et al. | 359/588 |
| 4,425,022 A * | 1/1984 | Ludwig | 359/360 |
| 4,595,832 A * | 6/1986 | LaDelfe et al. | 250/338.3 |
| 5,091,244 A | 2/1992 | Biornard | |
| 5,715,103 A * | 2/1998 | Amano et al. | 359/888 |
| 2002/0176183 A1* | 11/2002 | Erz et al. | 359/885 |
| 2005/0099691 A1* | 5/2005 | Hendrix et al. | 359/557 |

FOREIGN PATENT DOCUMENTS

| | | |
|---|---|---|
| EP | 1 182 175 | 12/2007 |
| JP | 01-168854 | 4/1989 |
| JP | 1-128829 | 5/1989 |
| JP | 7-35921 | 7/1993 |
| JP | 6-44647 | 6/1994 |
| JP | 2590133 | 12/1996 |

OTHER PUBLICATIONS

European Search Report dated Sep. 7, 2010, for corresponding European Application No. 07 014 789.7.

* cited by examiner

*Primary Examiner* — Arnel C Lavarias
(74) *Attorney, Agent, or Firm* — K&L Gates, LLP (57) ABSTRACT

An antireflection film capable of reliably preventing light (or laser light), which is incident on a glass substrate and which reaches a metal film, from being reflected by the metal film. The antireflection film provided between a metal film having a complex refractive index represented by $N_M = n_M - i \cdot k_m$ and a glass substrate having a refractive index $N_G$ includes, from the metal film side: (A) a first dielectric layer having a refractive index $N_1$; (B) a second dielectric layer provided on the first dielectric layer and having a refractive index $N_2$; and (C) a third dielectric layer provided on the second dielectric layer and having a refractive index $N_3$, in which $N_1 < n_M$, $N_1 > N_G$, $N_2 < N_G$, and $N_3 > N_G$ hold. Accordingly, light which is incident on the glass substrate and which reaches the metal film is prevented from being reflected by the metal film.

12 Claims, 5 Drawing Sheets

ANTIREFLECTION FILM

CROSS REFERENCES TO RELATED APPLICATIONS

The present application claims priority to Japanese Patent Application JP 2006-205518 filed in the Japanese Patent Office on Jul. 28, 2006, the entire contents of which are incorporated herein by reference.

BACKGROUND

The present disclosure relates to an antireflection film, a method for heating a metal film, and a heating apparatus.

For example, when light traveling in air is incident on a medium, reflection occurs at a light incident surface of the medium. This reflection is caused by the difference between the refractive index of air and that of the medium. As a method for suppressing the reflection as described above, a technique has been used in which a single-layer or a multilayer antireflection film is provided on the light incident surface of the medium, such as a surface of a glass substrate, by a vacuum deposition method or the like.

In particular, for example, in Japanese Patent No. 2590133, an antireflection film shown in the following Table 1 has been disclosed. In addition, for example, in Japanese Unexamined Patent Application Publication No. 1-168854, an antireflection film shown in the following Table 2 has been disclosed.

TABLE 1

| | Refractive Index | Film Thickness (Å) |
|---|---|---|
| (Part I) | | |
| Low refractive-index dielectric film | 1.35~1.50 | 700~1,200 |
| High refractive-index dielectric film | 1.90~2.50 | 200~400 |
| Metal film | | 20~60 |
| Transparent substrate | 1.45~1.60 | |
| (Part II) | | |
| Low refractive-index dielectric film | 1.35~1.50 | 700~1,200 |
| High refractive-index dielectric film | 1.90~2.50 | 1,000~1,400 |
| Metal film | | 10~40 |
| Transparent substrate | 1.45~1.60 | |

TABLE 2

| | Refractive Index | Film Thickness ($\times \lambda_0/4$) |
|---|---|---|
| Second low refractive-index dielectric film | 1.37~1.50 | 0.8~1.2 |
| Second high refractive-index dielectric film | 2.00~2.40 | 0.03~0.80 |
| Metal film | | 35~90 Å |
| First low refractive-index dielectric film | 1.37~1.50 | 1.40~1.80 |
| First high refractive-index dielectric film | 2.00~2.40 | 0.30~0.50 |
| Transparent substrate | 1.40~1.70 | |

Incidentally, for example, when a metal film made of molybdenum is directly deposited on a glass substrate (refractive index: 1.51), a reflectance R at an interface between the glass substrate and the metal film is as shown below. In this case, $n_M$ and $k_M$ of a complex refractive index represented by $N_M = n_M - i \cdot k_m$ of the metal film made of molybdenum are 3.53 and 3.3, respectively.

$$R = \{(1.51-3.53)^2 + 3.3^2\}/(1.51+3.53)^2 + 3.3^2 = 0.41$$

When the reflectance R at the interface is high as described above, energy of laser light, which is incident on the glass substrate, reaches the metal film, and is absorbed therein, is decreased to approximately half of original power of a laser light source, and in addition, strong reflected light returns to the laser light source. As a result, laser oscillation becomes unstable, and in the worst case, the laser light source may be damaged. In the antireflection film disclosed in the above Japanese Patent No. 2590133, since the antireflection film is not provided between the glass substrate and the metal film, light which is incident on the glass substrate and which reaches the metal film may not be prevented from being reflected by the metal film. In addition, in the antireflection film disclosed in Japanese Unexamined Patent Application Publication No. 1-168854, it is attempted to prevent light incident on the second low refractive-index dielectric film from being reflected by the transparent substrate, and whether reflection of light which is incident on the glass substrate and which reaches the metal film can be prevented has not been described at all.

SUMMARY

Accordingly, it is desirable to provide an antireflection film capable of reliably preventing light (or laser light) which is incident on a glass substrate and which reaches a metal film from being reflected by the metal film, a method for heating a metal film of a laminated structure including the above antireflection film, and a heating apparatus suitable to the above method for heating a metal film.

According to an embodiment, there is provided an antireflection film which is provided between a metal film having a complex refractive index represented by $N_M = n_M - i \cdot k_m$ and a glass substrate having a refractive index $N_G$, and which includes, from the metal film side: (A) a first dielectric layer having a refractive index $N_1$; (B) a second dielectric layer provided on the first dielectric layer and having a refractive index $N_2$; and (C) a third dielectric layer provided on the second dielectric layer and having a refractive index $N_3$. In the above antireflection film, $N_1 < n_M$, $N_1 > N_G$, $N_2 < N_G$, and $N_3 > N_G$ hold, and as a result, light which is incident on the glass substrate and which reaches the metal film is prevented from being reflected by the metal film.

According to an embodiment, there is provided a method for heating a metal film which forms a laminated structure together with an antireflection film and a glass substrate, the method including the step of irradiating the metal film with laser light through the glass substrate and the antireflection film. In the method for heating a metal film described above, the metal film has a complex refractive index represented by $N_M = n_M - i \cdot k_m$, the glass substrate has a refractive index $N_G$, the antireflection film includes, from the metal film side, (A) a first dielectric layer having a refractive index $N_1$; (B) a second dielectric layer provided on the first dielectric layer and having a refractive index $N_2$; and (C) a third dielectric layer provided on the second dielectric layer and having a refractive index $N_3$, and $N_1 < n_M$, $N_1 > N_G$, $N_2 < N_G$, and $N_3 > N_G$ hold.

According to an embodiment, there is provided a heating apparatus for heating a metal film which forms a laminated structure together with an antireflection film and a glass substrate by irradiating the metal film with laser light through the glass substrate and the antireflection film, the heating apparatus including: (a) a laminated structure receiving stage receiving the laminated structure with a gap provided therebetween so that the metal film faces downward; (b) a laser light source; and (c) a moving device relatively moving the laminated structure receiving stage and the laser light source. In the heating apparatus described above, the metal film has a complex refractive index represented by $N_M = n_M - i \cdot k_m$, the glass substrate has a refractive index $N_G$, the antireflection film includes, from the metal film side, (A) a first dielectric layer having a refractive index $N_1$; (B) a second dielectric layer provided on the first dielectric layer and having a refractive index $N_2$; and (C) a third dielectric layer provided on the second dielectric layer and having a refractive index $N_3$, and $N_1 < n_M$, $N_1 > N_G$, $N_2 < N_G$, and $N_3 > N_G$ hold.

The method for heating a metal film according to the embodiment of the present invention can be applied to a method for processing a workpiece in which after a coating material is placed or formed on a surface of the metal film, the metal film is heated by irradiation of laser light, the coating material is simultaneously heated using this metal film as a heating medium so as to be evaporated, decomposed, or sublimated, and as a result, the coating material is adhered to or tightly bonded to the workpiece disposed to face the metal film. In the method for processing a workpiece as described above, the workpiece may be placed on the laminated structure receiving stage so as to face the metal film.

In the antireflection film according to the embodiment, the antireflection film in the method for heating a metal film according to the embodiment, and the antireflection film used in the heating apparatus according to the embodiment (hereinafter, these antireflection films may be collectively referred to as the "antireflection film according to the embodiments of the present invention"), the refractive index $N_1$ of the first dielectric layer preferably satisfies the following equation (1).

$$1.51 < N_1 < 3.53 \quad (1)$$

Alternatively, in the antireflection film according to the embodiments of the present invention, when the wavelength of the incident light (or laser light) is represented by $\lambda$, an optical admittance $Y_1$ obtained when the first dielectric layer has a minimum thickness at which the reflectance of a laminated structure of the metal film and the first dielectric layer is minimized and an optical admittance $Y_2$ obtained from a laminated structure of the glass substrate, the third dielectric layer having an optical thickness of $\lambda/4$, and the second dielectric layer having an optical thickness of $\lambda/4$ preferably satisfy the following equation (2). Instead of the expression of the "optical thickness of $\lambda/4$", "¼ wavelength" may be used in some cases.

$$|Y_1 - Y_2|/\alpha \le 0.04 \quad (2)$$

In the antireflection film according to the embodiments of the present invention, the optical admittances $Y_1$ and $Y_2$ can be represented by the following equations (3) and (4), respectively. However, in the equations (2) and (3), $\alpha \equiv (n_M^2 + k_M^2 + N_1^2)/(2 \times n_M)$ holds.

$$Y_1 = \alpha - \{(n_M - \alpha)^2 + k_M^2\}^{1/2} \quad (3)$$

$$Y_2 = (N_G \times N_2^2)/N_3^2 \quad (4)$$

In the antireflection film, the method for heating a metal film, and the heating apparatus, according to the embodiments, (these may be collectively and simply called "the present invention" in some cases) including, for example, the preferable structures described above, it is preferable that in the antireflection film according to the embodiments, the metal film include molybdenum (Mo), that the second dielectric layer include $MgF_2$, that $n_M = 3.53 \pm 0.10$, $k_M = 3.30 \pm 0.10$, $N_G = 1.51 \pm 0.10$, and $N_2 = 1.38 \pm 0.10$ hold, and that $4.29 \le N_1 + N_3 \le 4.40$ holds. In addition, in this case, as the combination (between a material forming the first dielectric layer and a material forming the third dielectric layer), for example, $(TiO_2, SiO_x)$, $(Nb_2O_5, Ta_2O_5)$, $(Nb_2O_5, ZrO_2)$, $(CeO_2,$ $Ta_2O_5)$, $(CeO_2, ZrO_2)$, $(Ta_2O_5, Nb_2O_5)$, $(Ta_2O_5, CeO_2)$, $(ZrO_2, Nb_2O_5)$, $(ZrO_2, CeO_2)$, or $(HfO_2, ZnS)$ may be mentioned.

Alternatively, in an embodiment, it is preferable that in the antireflection film, the metal film include chromium (Cr), that the second dielectric layer include $MgF_2$, that $n_M = 3.18 \pm 0.10$, $k_M = 4.41 \pm 0.10$, $N_G = 1.51 \pm 0.10$, and $N_2 = 1.38 \pm 0.10$ hold, and that $4.69 \le N_1 + N_3 \le 4.75$ holds. In addition, in this case, as the combination (between a material forming the first dielectric layer and a material forming the third dielectric layer), for example, $(TiO_2, ZnS)$ or $(ZnS, TiO_2)$ may be mentioned.

Alternatively, it is preferable that in the antireflection film, according to the embodiment, the metal film include a nickel alloy (in more particular, a nickel alloy including nickel, chromium, molybdenum, niobium, iron, or the like, or an alloy known as Inconel (registered trademark)), that the second dielectric layer include $MgF_2$, that $n_M = 2.94 \pm 0.10$, $k_M = 2.92 \pm 0.10$, $N_G = 1.51 \pm 0.10$, and $N_2 = 1.38 \pm 0.10$ hold, and that $4.14 \le N_1 + N_3 \le 4.22$ holds. In addition, in this case, as the combination (between a material forming the first dielectric layer and a material forming the third dielectric layer), for example, $(TiO_2, Y_2O_3)$ may be mentioned.

Alternatively, it is preferable that in the antireflection film, according to the embodiment, the metal film include molybdenum (Mo), that the second dielectric layer include $SiO_x$, that $n_M = 3.53 \pm 0.10$, $k_M = 3.30 \pm 0.10$, $N_G = 1.51 \pm 0.10$, and $N_2 = 1.46 \pm 0.10$ hold, and that $4.46 \le N_1 + N_3 \le 4.52$ holds. In addition, in this case, as the combination (between a material forming the first dielectric layer and a material forming the third dielectric layer), for example, $(Nb_2O_5, Nb_2O_5)$, $(Nb_2O_5, CeO_2)$, $(CeO_2, CeO_2)$, or $(CeO_2, Nb_2O_5)$ may be mentioned.

In addition, the following equation (5) preferably holds.

$$7.08 \le n_M + N_1 + N_3 \le 8.28 \quad (5)$$

In an embodiment, a second antireflection film is preferably provided on the surface of the glass substrate opposite to that on which the third dielectric layer is provided, and hence light (or laser light) incident on the glass substrate can be reliably prevented from being reflected by the surface of the glass substrate. Furthermore, the glass substrate of a laminated structure composed of the second antireflection film, the glass substrate, the third dielectric layer, the second dielectric layer, the first dielectric layer, and the metal film preferably has a curvature radius of $1.0 \times 10^5$ m or more. When the curvature radius of the glass substrate is defined as described above, a phenomenon can be prevented in which a method for heating a metal film is difficult to perform due to warpage of the laminated structure.

In the method for heating a metal film and the heating apparatus, according to the embodiments, as the laser light, laser light having a wavelength of 808, 885, 915, 976, or 980 nm may be mentioned by way of example. In addition, as a laser light source capable of emitting the above laser light, for example, an ultra high output semiconductor laser (such as InAlGaAs semiconductor laser) capable of continuously emitting several tens of watts may be used. In the heating apparatus according to the embodiment, although the laminated structure receiving stage and the laser light source are relatively moved, the laminated structure receiving stage may be moved while the laser light source is fixed, the laser light source may be moved while the laminated structure receiving stage is fixed, or the laminated structure receiving stage and the laser light source may both be moved. When the laminated structure receiving stage is moved, as the laminated structure receiving stage, for example, a known X-Y stage used for semiconductor device manufacturing may be used, and in this case, a moving device is incorporated in the X-Y stage.

In the antireflection film, the method for heating a metal film, and the heating apparatus, according to the embodiments, since the antireflection film having a three-layered structure is provided between the glass substrate and the metal film, when the metal film is heated through the glass substrate, the reflectance at the interface between the glass substrate and the metal film, which is caused by the difference in refractive index therebetween, can be decreased. As a result, in addition to the improvement in absorption efficiency of incident light (or laser light) in the metal film, the quantity of returning light of the incident light (or laser light) can also be decreased. Hence, stable operation of the light source can be realized.

Additional features and advantages are described herein, and will be apparent from, the following Detailed Description and the figures.

DETAILED DESCRIPTION

Hereinafter, the embodiments will be described with reference to the drawings.

Embodiment 1

Embodiment 1 relates to an antireflection film, a method for heating a metal film, and a heating apparatus, according to embodiments. As shown in schematic, partial cross-sectional views of FIGS. 1A and 1B, an antireflection film 20 according to Embodiment 1 and the following Embodiments 2 to 5 is provided between a metal film 30 having a complex refractive index represented by $N_M = n_M - i \cdot k_m$ and a glass substrate 11 having a refractive index $N_G$ and is composed of, from the metal film side: (A) a first dielectric layer 21 having a refractive index $N_1$; (B) a second dielectric layer 22 provided on the first dielectric layer 21 and having a refractive index $N_2$; and (C) a third dielectric layer 23 provided on the second dielectric layer 22 and having a refractive index $N_3$.

Figure 1A:
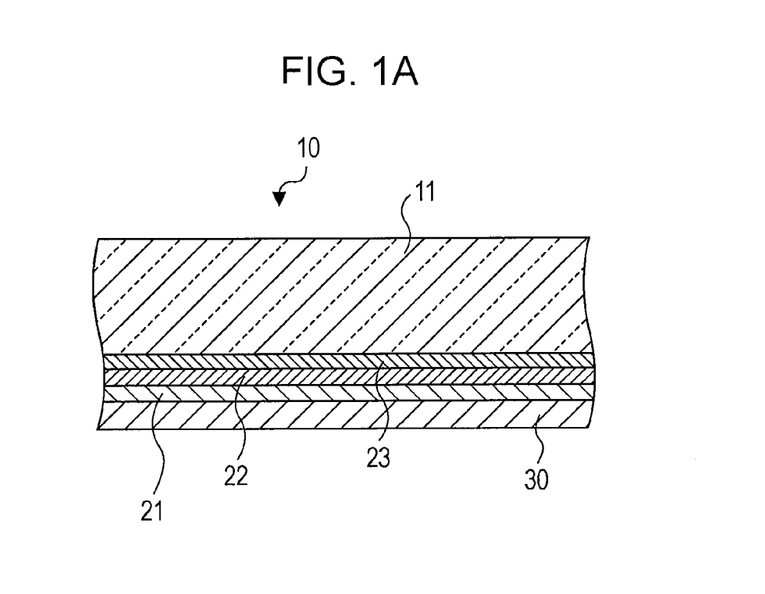
FIG. 1A is a schematic, partial cross-sectional view of a laminated structure of Embodiment 1.
Figure 1B:
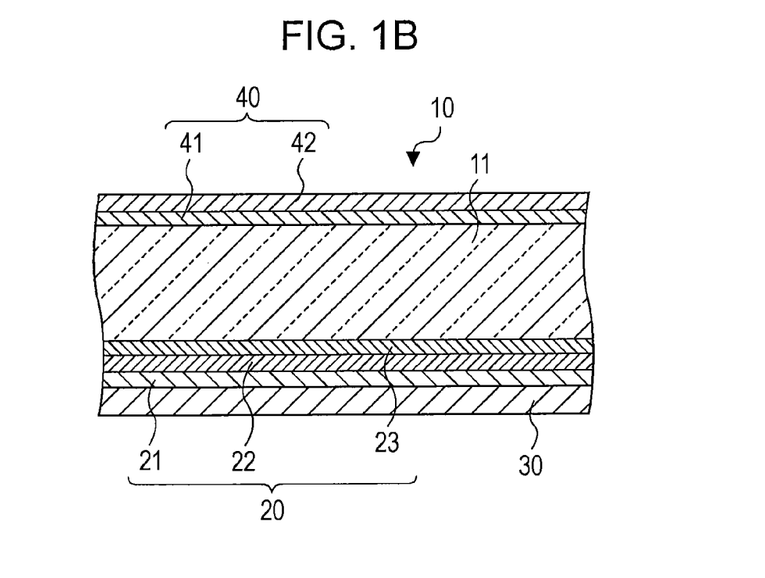
FIG. 1B is a schematic, partial cross-sectional view of a laminated structure of Embodiment 5.

In addition, $N_1 < n_M$, $N_1 > N_G$, $N_2 < N_G$, and $N_3 > N_G$ hold, and hence light incident on the glass substrate 11 and reaching the metal film 30 is prevented from being reflected by the metal film 30.

In Embodiment 1 and the following Embodiments 2 to 5, as the glass substrate 11, a glass substrate for a liquid crystal display device sold under the registered trademark Eagle 2000 by Corning Inc. was used. This glass substrate 11 has a refractive index $N_G$ of 1.5068 at a wavelength of 589 nm, a coefficient of thermal expansion of $31.8 \times 10^{-7}$ (0 to 300° C.), and a Young's modulus of $6.95 \times 10^{10}$ Pa ($7.09 \times 10^3$ kgw/mm$^2$).

In addition, in Embodiment 1 and the following Embodiments 2 to 5, as incident light (or laser light), laser light having a wavelength λ of 808 nm was used, and as a laser light source capable of emitting the above laser light, an ultra high output semiconductor laser (such as InAlGaAs semiconductor laser) capable of continuously emitting several tens of watts was used.

In Embodiment 1, the metal film 30 was formed from molybdenum (Mo). In the complex refractive index $N_M = n_M - i \cdot k_M$ of the metal film 30 made of molybdenum at a wavelength of 823 nm, $n_M$ is 3.53, and $k_M$ is 3.3. That is, $N_M = 3.53 - i \cdot 3.3$ holds. In addition, the coefficient of thermal expansion is $37 \times 10^{-7}$ to $53 \times 10^{-7}$ (20 to 100° C.).

In addition, as a material forming the first dielectric layer 21, titanium dioxide (TiO$_2$) was used. In this case, the refractive index $N_1$ of the first dielectric layer 21 made of TiO$_2$ is 2.4, and the following equation (1) is satisfied. The equation (1) is also satisfied in the following Embodiments 2 to 5. In addition, also in Embodiment 1, the second dielectric layer 22 was formed from magnesium fluoride (MgF$_2$) having a film thickness of ¼ wavelength and a refractive index $N_2$ of 1.38, and the third dielectric layer 23 was formed from silicon oxide (SiO$_x$) having a film thickness of ¼ wavelength and a refractive index $N_2$ of 1.90.

$$1.51 < N_1 < 3.53 \tag{1}$$

In general, the locus of an optical admittance (also called an "equivalent admittance") of a laminated structure composed of the metal film 30 having a complex refractive index represented by $N_M = n_M - i \cdot k_m$ and the first dielectric layer 21 formed thereon having a refractive index $N_1$ is a circle having a center O ($x_0, y_0$) on a complex plane and passes through an origin A ($n_M, -k_M$). In this case, $x_0 = (n_M^2 + k_M^2 + N_1^2)/(2 \times n_M)$ and $y_0 = 0$ hold, and the circle, that is, this optical admittance locus (called the "optical admittance locus circle"), can be represented by the following equation (6).

$$(x - x_0)^2 + y^2 = x_0^2 - N_1^2 \tag{6}$$

Accordingly, the center O ($x_0, y_0$), the origin A ($x_A, y_A$), the radius r, and the equation of the optical admittance locus circle of the laminated structure composed of the metal film 30 made of molybdenum and the first dielectric layer 21 of TiO$_2$ formed thereon having an optional thickness are as follows.

$x_0 = (3.53^2 + 3.3^2 + 2.4^2)/(2 \times 3.53) = 4.12$ $y_0 = 0$ $x_A = 3.53$ $y_A = -3.3$ $r = 3.35$ $(x - 4.12)^2 + y^2 = 3.35^2$ In addition, the optical admittance locus circle intersects the real axis (x axis) at a point B (0.77,0). In this case, the point B at which the optical admittance $Y_1$ has a real number gives a minimum reflectance. In addition, the optical admittance $Y_1$ obtained when the first dielectric layer 21 has a minimum thickness at which the reflectance of the laminate structure of the metal film 30 and the first dielectric layer 21 is minimized (hereinafter, the optical admittance $Y_1$ as described above may be simply called the "optical admittance $Y_1$") can be obtained from the following equation (3). In this equation, $\alpha \equiv x_0 \equiv (n_M^2 + k_M^2 + N_1^2)/(2 \times n_M)$ holds.

$$Y_1 = \alpha - \{(n_M - \alpha)^2 + k_M^2\}^{1/2} \quad (3)$$
$$= 0.77$$

Since the optical admittance of air is 1.0, it means that the optical admittance at the point B of the laminated structure composed of the metal film 30 made of molybdenum and the first dielectric layer 21 of $TiO_2$ formed thereon having a predetermined thickness is close to the optical admittance of air. In addition, when a dielectric material having a refractive index higher than that of titanium dioxide is available, it is understood that an optical admittance which is much more closer to the optical admittance of air can be obtained.

In general, a minimum film thickness $d_{min}$ of the first dielectric layer 21 at which the reflectance of the laminated structure composed of the metal film 30 having a complex refractive index represented by $N_M = n_M - i \cdot k_m$ and the first dielectric layer 21 formed thereon having a refractive index $N_1$ is minimized can be calculated as follows. That is, when the minimum value of the phase thickness is represented by $\delta_{min}$ (unit: rad), the following equations hold.

$$\tan(2\delta_{min}) = [2 \times (-k_M) \times N_1]/(n_M^2 + k_M^2 - N_1^2) \quad (7-1)$$

$$\delta'_{min} = (\pi + 2\delta_{min})(\text{rad})$$

$$d_{min} = (\delta'_{min} \times \lambda)/(2\pi \times N_1) \quad (7-2)$$

From the equations (7-1) and (7-2), the minimum film thickness $d_{min}$ of the first dielectric layer 21 made of $TiO_2$ in Embodiment 1, which gives the minimum reflectance, is 65 nm.

In addition, the optical admittance $Y_2$ obtained when the third dielectric layer 23 of $SiO_x$ having a refractive index $N_3$ of 1.90 and a film thickness of ¼ wavelength is formed on the glass substrate 11 having a refractive index of 1.51, and on the third dielectric layer 23, the second dielectric layer 22 of $MgF_2$ having a refractive index $N_2$ of 1.38 and a film thickness of ¼ wavelength is further formed, that is, the optical admittance $Y_2$ obtained from a laminated structure composed of the glass substrate 11, the third dielectric layer 23 having an optical thickness of $\lambda/4$, and the second dielectric layer 22 having an optical thickness of $\lambda/4$, can be obtained from the following equation (4).

$$Y_2 = (N_G \times N_2^2)/N_3^2 \quad (4)$$

This optical admittance $Y_2$ is approximately equivalent to the optical admittance $Y_1$. That is, the following equation (2) is satisfied. The following equation (2) is also satisfied in the following Embodiments 2 to 5. Accordingly, when the refractive index ($N_2$) and the film thickness of the second dielectric layer 22 are set to 1.38 and ¼ wavelength, respectively, and the refractive index ($N_3$) and the film thickness of the third dielectric layer 23 are set to 1.90 and ¼ wavelength, respectively, the optical admittance of the three-layered antireflection film provided on the metal film 30 is close to the optical admittance of the glass substrate 11, and hence the reflectance at the interface between the metal film 30 and the glass substrate 11 can be minimized. As a result, when the metal film 30 is heated through the glass substrate 11, the reflectance at the interface between the glass substrate 11 and the metal film 30 which is caused by the difference in refractive index therebetween can be decreased, and in addition to the improvement in absorption efficiency of the incident light (or laser light) in the metal film 30, the quantity of returning light of the incident light (or laser light) can be decreased; hence, stable operation of the light source can be realized.

$$|Y_1 - Y_2|/\alpha \leq 0.04 \quad (2)$$

In Embodiment 1, $n_M = 3.53 \pm 0.10$, $k_M = 3.30 \pm 0.10$, $N_G = 1.51 \pm 0.10$, and $N_2 = 1.38 \pm 0.10$ hold, and $4.29 \leq N_1 + N_3 \leq 4.40$ holds. In addition, $7.08 \leq n_M + N_1 + N_3 \leq 8.28$ also holds.

The results described above are summarized in Table 3 as Embodiment 1-1. In addition, in Embodiment 1, embodiments in which while parameters of the glass substrate 11, the metal film 30 made of molybdenum, and the second dielectric layer 22 made of magnesium fluoride ($MgF_2$) are fixed, the refractive index $N_1$ of the first dielectric layer 21 and the refractive index $N_3$ of the third dielectric layer 23 are changed are summarized in Tables 3 and 4 as Embodiment 1-2, 1-3, and 1-4.

That is, in Embodiment 1-2, the first dielectric layer 21 was formed from niobium pentaoxide ($Nb_2O_5$) or cerium oxide ($CeO_2$) having a film thickness of ¼ wavelength and a refractive index $N_1$ of 2.2. In addition, the third dielectric layer 23 was formed from tantalum pentaoxide ($Ta_2O_5$) or zirconium dioxide ($ZrO_2$) having a film thickness of ¼ wavelength and a refractive index $N_3$ of 2.1.

Accordingly, the center O ($x_0, y_0$), the origin A ($x_A, y_A$), the radius r, and the equation of the optical admittance locus circle of the laminated structure composed of the metal film 30 made of molybdenum and the first dielectric layer 21 formed thereon having an optional thickness are as follows.

$$x_0 = (3.53^2 + 3.3^2 + 2.2^2)/(2 \times 3.53) = 3.99$$

$$y_0 = 0$$

$$x_A = 3.53$$

$$y_A = -3.3$$

$$r = 3.33$$

$$(x - 3.99)^2 + y^2 = 3.33^2$$

In addition, this optical admittance locus circle intersects the real axis (x axis) at a point B (0.66,0). In this case, the point B gives a minimum reflectance. The optical admittance $Y_1$ obtained from the equation (3) is 0.66. In addition, when the minimum film thickness $d_{min}$ of the first dielectric layer 21, which gives the minimum reflectance, is calculated from the equations (7-1) and (7-2), 72 nm is obtained.

In addition, the optical admittance $Y_2$ obtained when the third dielectric layer 23 made of $Ta_2O_5$ or $ZrO_2$ having a refractive index $N_3$ of 2.10 and a film thickness of ¼ wavelength is formed on the glass substrate 11 having a refractive index of 1.51, and on the third dielectric layer 23, the second dielectric layer 22 made of $MgF_2$ having a refractive index $N_2$ of 1.38 and a film thickness of ¼ wavelength is further formed, that is, the optical admittance $Y_2$ obtained from a laminated structure composed of the glass substrate 11, the third dielectric layer 23 having an optical thickness of $\lambda/4$, and the second dielectric layer 22 having an optical thickness of λ/4, can be obtained from the equation (4), and $Y_2$ is 0.65.

This optical admittance $Y_2$ is approximately equivalent to the optical admittance $Y_1$. That is, when the refractive index $N_2$ and the film thickness of the second dielectric layer 22 are set to 1.38 and ¼ wavelength, respectively, and the refractive index $N_3$ and the film thickness of the third dielectric layer 23 are set to 2.10 and ¼ wavelength, respectively, the optical admittance of the three-layered antireflection film provided on the metal film 30 is close to the optical admittance of the glass substrate 11, and hence the reflectance at the interface between the metal film 30 and the glass substrate 11 can be minimized.

In addition, in Embodiment 1-3, the first dielectric layer 21 was formed from tantalum pentaoxide ($Ta_2O_5$) or zirconium dioxide ($ZrO_2$) having a film thickness of ¼ wavelength and a refractive index $N_1$ of 2.1. In addition, the third dielectric layer 23 was formed from niobium pentaoxide ($Nb_2O_5$) or cerium oxide ($CeO_2$) having a film thickness of ¼ wavelength and a refractive index $N_3$ of 2.2.

Accordingly, the center O ($x_0,y_0$), the origin A ($x_A,y_A$), the radius r, and the equation of the optical admittance locus circle of the laminated structure composed of the metal film 30 made of molybdenum and the first dielectric layer 21 formed thereon having an optional thickness are as follows.

$x_0 = (3.53^2 + 3.3^2 + 2.1^2)/(2 \times 3.53) = 3.93$ $y_0 = 0$ $x_A = 3.53$ $y_A = -3.3$ $r = 3.32$ $(x - 3.93)^2 + y^2 = 3.32^2$ In addition, this optical admittance locus circle intersects the real axis (x axis) at a point B (0.61,0). In this case, the point B gives a minimum reflectance. The optical admittance $Y_1$ obtained from the equation (3) is 0.61. In addition, when the minimum film thickness $d_{min}$ of the first dielectric layer 21, which gives the minimum reflectance, is calculated from the equations (7-1) and (7-2), 77 nm is obtained.

In addition, the optical admittance $Y_2$ obtained when the third dielectric layer 23 made of $Nb_2O_5$ or $CeO_2$ having a refractive index $N_3$ of 2.20 and a film thickness of ¼ wavelength is formed on the glass substrate 11 having a refractive index of 1.51, and on the third dielectric layer 23, the second dielectric layer 22 made of $MgF_2$ having a refractive index $N_2$ of 1.38 and a film thickness of ¼ wavelength is further formed, that is, the optical admittance $Y_2$ obtained from a laminated structure composed of the glass substrate 11, the third dielectric layer 23 having an optical thickness of λ/4, and the second dielectric layer 22 having an optical thickness of λ/4, can be obtained from the equation (4), and $Y_2$ is 0.59.

This optical admittance $Y_2$ is approximately equivalent to the optical admittance $Y_1$. Accordingly, when the refractive index $N_2$ and the film thickness of the second dielectric layer 22 are set to 1.38 and ¼ wavelength, respectively, and the refractive index $N_3$ and the film thickness of the third dielectric layer 23 are set to 2.20 and ¼ wavelength, respectively, the optical admittance of the three-layered antireflection film provided on the metal film 30 is close to the optical admittance of the glass substrate 11, and hence the reflectance at the interface between the metal film 30 and the glass substrate 11 can be minimized.

Furthermore, in Embodiment 1-4, the first dielectric layer 21 was formed from hafnium dioxide ($HfO_2$) having a film thickness of ¼ wavelength and a refractive index $N_1$ of 1.98. In addition, the third dielectric layer 23 was formed from zinc sulfide (ZnS) having a film thickness of ¼ wavelength and a refractive index $N_3$ of 2.3.

Accordingly, the center O ($x_0,y_0$), the origin A ($x_A,y_A$), the radius r, and the equation of the optical admittance locus circle of the laminated structure composed of the metal film 30 made of molybdenum and the first dielectric layer 21 formed thereon having an optional thickness are as follows.

$x_0 = (3.53^2 + 3.3^2 + 1.98^2)/(2 \times 3.53) = 3.86$ $y_0 = 0$ $x_A = 3.53$ $y_A = -3.3$ $r = 3.32$ $(x - 3.86)^2 + y^2 = 3.32^2$ In addition, this optical admittance locus circle intersects the real axis (x axis) at a point B (0.55,0). In this case, the point B gives a minimum reflectance. The optical admittance $Y_1$ obtained from the equation (3) is 0.55. In addition, when the minimum film thickness $d_{min}$ of the first dielectric layer 21, which gives the minimum reflectance, is calculated from the equations (7-1) and (7-2), 83 nm is obtained.

In addition, the optical admittance $Y_2$ obtained when the third dielectric layer 23 made of ZnS having a refractive index $N_3$ of 2.30 and a film thickness of ¼ wavelength is formed on the glass substrate 11 having a refractive index of 1.51, and on the third dielectric layer 23, the second dielectric layer 22 made of $MgF_2$ having a refractive index $N_2$ of 1.38 and a film thickness of ¼ wavelength is further formed, that is, the optical admittance $Y_2$ obtained from a laminated structure composed of the glass substrate 11, the third dielectric layer 23 having an optical thickness of λ/4, and the second dielectric layer 22 having an optical thickness of λ/4, can be obtained from the equation (4), and $Y_2$ is 0.54.

This optical admittance $Y_2$ is approximately equivalent to the optical admittance $Y_1$. Accordingly, when the refractive index $N_2$ and the film thickness of the second dielectric layer 22 are set to 1.38 and ¼ wavelength, respectively, and the refractive index $N_3$ and the film thickness of the third dielectric layer 23 are set to 2.30 and ¼ wavelength, respectively, the optical admittance of the three-layered antireflection film provided on the metal film 30 is close to the optical admittance of the glass substrate 11, and hence the reflectance at the interface between the metal film 30 and the glass substrate 11 can be minimized.

Figure 2:
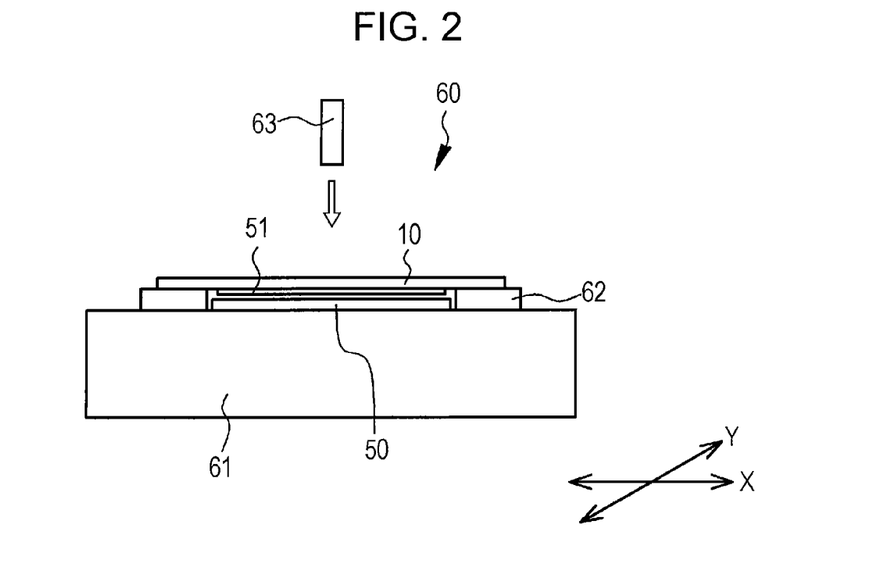
FIG. 2 is a schematic view of a heating apparatus of Embodiment 1.

A schematic view of a heating apparatus 60 of Embodiment 1 is shown in FIG. 2. This heating apparatus 60 is a heating apparatus for heating the metal film 30 of a laminated structure 10 by irradiation with laser light through the glass substrate 11 and the antireflection film 20. As described above, the laminated structure 10 is a laminated structure composed of the metal film 30 having a complex refractive index represented by $N_M = n_M - i \cdot k_m$, the antireflection film 20, and the glass substrate 11 having a refractive index $N_G$.

In addition, this heating apparatus 60 has a laminated structure receiving stage 61 receiving the laminated structure 10 with a space provided therebetween so that the metal film 30 faces downward, a laser light source 63, and a moving device relatively moving the laminated structure receiving stage 61 and the laser light source 63. As described above, as the laser light (incident light), laser light having a wavelength λ of 808 nm is used, and as the laser light source 63, an ultra high output semiconductor laser (such as InAlGaAs semiconductor laser) capable of continuously emitting several tens of watts was used. In addition, in the heating apparatus 60 of Embodiment 1 in which the laser light source 63 is fixed and the laminated structure receiving stage 61 is moved, this laminated structure receiving stage 61 is formed of a known X-Y stage used for semiconductor device manufacturing, and the moving device is incorporated in the X-Y stage. On the top surface of the laminated structure receiving stage 61, a laminated structure receiving portion 62 incorporating a vacuum chuck device (not shown) is provided. The laminated structure receiving portion 62 has a flat and picture-frame shape and holds the laminated structure 10 at the top surface thereof by vacuum chuck. In addition, at a part of the top surface of the laminated structure receiving stage 61, which is exposed inside the laminated structure receiving portion 62, a vacuum chuck device (not shown) is also provided.

In addition, in the method for heating a metal film, according to the embodiment, the metal film 30 is heated by irradiating the metal film 30 of the laminated structure 10 with laser light through the glass substrate 11 and the antireflection film 20. In particular, after a sheet-shaped workpiece 50 is aligned on the top surface of the laminated structure receiving stage 61 by an alignment device (not shown), the workpiece 50 is fixed on the laminated structure receiving stage 61 by the vacuum chuck device (not shown). In addition, after the laminated structure 10 having the metal film 30 on which a coating material 51 is placed or formed is received on the laminated structure receiving portion 62 so that the metal film 30 faces the top surface of the laminated structure receiving stage 61 and is then aligned by an alignment device (not shown), the laminated structure 10 is fixed on the laminated structure receiving portion 62 by the vacuum chuck device (not shown). Subsequently, the laser light source 63 is operated to heat the metal film 30 by irradiating it with laser light through the glass substrate 11 and the antireflection film 20, and the coating material 51 is heated using this metal film 30 as one type of heating medium to be evaporated, decomposed, or sublimated, so that the coating material 51 is adhered to or tightly bonded to the workpiece 50 disposed to face the metal film 30. By the processing method as described above, the coating material 51 can be adhered to or tightly bonded to a desired minute region of the workpiece 50 by a so-called maskless processing. In the processing method as described above, a melting temperature of the metal film 30 is preferably higher than the temperature at which the coating material 51 is evaporated or sublimated. The atmosphere inside the heating apparatus 60 in which the laminated structure 10 and the workpiece 50 are placed is dependent, for example, on the coating material 51, and it may be an air atmosphere, a vacuum atmosphere, or an inert gas atmosphere.

In addition, the heating apparatus, the method for heating a metal film, and the processing method of Embodiment 1 described above can also be applied to the following Embodiments 2 to 5.

Embodiment 2

Embodiment 2 is a modification of Embodiment 1. In Embodiment 2, the metal film 30 was formed from chromium (Cr), and the second dielectric layer 22 was formed from $MgF_2$ having a film thickness of ¼ wavelength and a refractive index $N_2$ of 1.38. In the complex refractive index represented by $N_M = n_M - i \cdot k_m$ of the metal film 30 made of chromium at a wavelength of 808 nm, $n_M$ is 3.18 and $k_M$ is 4.41. That is, $N_M = 3.18 - i \cdot 4.41$ holds. In this case, $n_M = 3.18 \pm 0.10$, $k_M = 4.41 \pm 0.10$, $N_G = 1.51 \pm 0.10$, and $N_2 = 1.38 \pm 0.10$ hold, and $4.69 \leq N_1 + N_3 \leq 4.75$ holds. In addition, $7.08 \leq n_M + N_1 + N_3 \leq 8.28$ holds.

Furthermore, in Embodiment 2-1, the first dielectric layer 21 was formed from titanium dioxide ($TiO_2$) having a film thickness of ¼ wavelength and a refractive index $N_1$ of 2.4. In addition, the third dielectric layer 23 was formed from zinc sulfide (ZnS) having a film thickness of ¼ wavelength and a refractive index $N_3$ of 2.3.

Accordingly, the center O $(x_0, y_0)$, the origin A $(x_A, y_A)$, the radius r, and the equation of the optical admittance locus circle of the laminated structure composed of the metal film 30 made of chromium and the first dielectric layer 21 formed thereon having an optional thickness are as follows.

$$x_0 = (3.18^2 + 4.41^2 + 2.24^2)/(2 \times 3.18) = 5.55$$

$$y_0 = 0$$

$$x_A = 3.18$$

$$y_A = -4.41$$

$$r = 5.01$$

$$(x - 5.55)^2 + y^2 = 5.01^2$$

In addition, this optical admittance locus circle intersects the real axis (x axis) at a point B (0.55,0). In this case, the point B gives a minimum reflectance. The optical admittance $Y_1$ obtained from the equation (3) is 0.55. In addition, when the minimum film thickness $d_{min}$ of the first dielectric layer 21, which gives the minimum reflectance, is calculated from the equations (7-1) and (7-2), 65 nm is obtained.

In addition, the optical admittance $Y_2$ obtained when the third dielectric layer 23 made of ZnS having a refractive index $N_3$ of 2.30 and a film thickness of ¼ wavelength is formed on the glass substrate 11 having a refractive index of 1.51, and on the third dielectric layer 23, the second dielectric layer 22 made of $MgF_2$ having a refractive index $N_2$ of 1.38 and a film thickness of ¼ wavelength is further formed, that is, the optical admittance $Y_2$ obtained from a laminated structure composed of the glass substrate 11, the third dielectric layer 23 having an optical thickness of λ/4, and the second dielectric layer 22 having an optical thickness of λ/4, can be obtained from the equation (4), and $Y_2$ is 0.54.

This optical admittance $Y_2$ is approximately equivalent to the optical admittance $Y_1$. Accordingly, when the refractive index $N_2$ and the film thickness of the second dielectric layer 22 are set to 1.38 and ¼ wavelength, respectively, and the refractive index $N_3$ and the film thickness of the third dielectric layer 23 are set to 2.30 and ¼ wavelength, respectively, the optical admittance of the three-layered antireflection film provided on the metal film 30 is close to the optical admittance of the glass substrate 11, and hence the reflectance at the interface between the metal film 30 and the glass substrate 11 can be minimized.

In addition, in Embodiment 2-2, the first dielectric layer 21 was formed from zinc sulfide (ZnS) having a film thickness of ¼ wavelength and a refractive index $N_1$ of 2.3. In addition, the third dielectric layer 23 was formed from titanium dioxide ($TiO_2$) having a film thickness of ¼ wavelength and a refractive index $N_3$ of 2.4.

Accordingly, the center O $(x_0, y_0)$, the origin A $(x_A, y_A)$, the radius r, and the equation of the optical admittance locus circle of the laminated structure composed of the metal film 30 made of chromium and the first dielectric layer 21 formed thereon having an optional thickness are as follows.

$x_0 = (3.18^2 + 4.41^2 + 2.3^2)/(2 \times 3.18) = 5.48$ $y_0 = 0$ $x_A = 3.18$ $y_A = -4.41$ $r = 4.97$ $(x - 5.48)^2 + y^2 = 4.97^2$ In addition, this optical admittance locus circle intersects the real axis (x axis) at a point B (0.51,0). In this case, the point B gives a minimum reflectance. The optical admittance $Y_1$ obtained from the equation (3) is 0.51. In addition, when the minimum film thickness $d_{min}$ of the first dielectric layer 21, which gives the minimum reflectance, is calculated from the equations (7-1) and (7-2), 68 nm is obtained.

In addition, the optical admittance $Y_2$ obtained when the third dielectric layer 23 made of $TiO_2$ having a refractive index $N_3$ of 2.40 and a film thickness of ¼ wavelength is formed on the glass substrate 11 having a refractive index of 1.51, and on the third dielectric layer 23, the second dielectric layer 22 made of $MgF_2$ having a refractive index $N_2$ of 1.38 and a film thickness of ¼ wavelength is further formed, that is, the optical admittance $Y_2$ obtained from a laminated structure composed of the glass substrate 11, the third dielectric layer 23 having an optical thickness of λ/4, and the second dielectric layer 22 having an optical thickness of λ/4, can be obtained from the equation (4), and $Y_2$ is 0.50.

This optical admittance Y2 is approximately equivalent to the optical admittance Y1. Accordingly, when the refractive index $N_2$ and the film thickness of the second dielectric layer 22 are set to 1.38 and ¼ wavelength, respectively, and the refractive index $N_3$ and the film thickness of the third dielectric layer 23 are set to 2.40 and ¼ wavelength, respectively, the optical admittance of the three-layered antireflection film provided on the metal film 30 is close to the optical admittance of the glass substrate 11, and hence the reflectance at the interface between the metal film 30 and the glass substrate 11 can be minimized.

The results described above are summarized in Table 5.

Embodiment 3

Embodiment 3 is also a modification of Embodiment 1. In Embodiment 3, the metal film 30 was formed from a nickel alloy (in more particular, a nickel alloy including nickel, chromium, molybdenum, niobium, iron or the like, or an alloy known as Inconel (registered trademark)), and the second dielectric layer 22 was formed from $MgF_2$ having a film thickness of ¼ wavelength and a refractive index $N_2$ of 1.38. In the complex refractive index represented by $N_M = n_M - i \cdot k_m$ of the metal film 30 made of a nickel alloy at a wavelength of 808 nm, $n_M$ is 2.94 and $k_M$ is 2.92. That is, $N_M = 2.94 - i \cdot 2.92$ holds. In this case, $n_M = 2.94 \pm 0.10$, $k_M = 2.92 \pm 0.10$, $N_G = 1.51 \pm 0.10$, and $N_2 = 1.38 \pm 0.10$ hold, and $4.14 \leq N_1 + N_3 \leq 4.22$ holds. In addition, $7.08 \leq n_M + N_1 + N_3 \leq 8.28$ holds.

Furthermore, in Embodiment 3, the first dielectric layer 21 was formed from titanium dioxide ($TiO_2$) having a film thickness of ¼ wavelength and a refractive index $N_1$ of 2.4. In addition, the third dielectric layer 23 was formed from $Y_2O_3$ having a film thickness of ¼ wavelength and a refractive index $N_3$ of 1.85.

Accordingly, the center O $(x_0, y_0)$, the origin A $(x_A, y_A)$, the radius r, and the equation of the optical admittance locus circle of the laminated structure composed of the metal film 30 made of a nickel alloy and the first dielectric layer 21 formed thereon having an optional thickness are as follows.

$x_0 = (2.94^2 + 2.92^2 + 2.4^2)/(2 \times 2.94) = 3.90$ $y_0 = 0$ $x_A = 2.94$ $y_A = -2.92$ $r = 3.07$ $(x - 3.90)^2 + y^2 = 3.07^2$ In addition, this optical admittance locus circle intersects the real axis (x axis) at a point B (0.83,0). In this case, the point B gives a minimum reflectance. The optical admittance $Y_1$ obtained from the equation (3) is 0.83. In addition, when the minimum film thickness $d_{min}$ of the first dielectric layer 21, which gives the minimum reflectance, is calculated from the equations (7-1) and (7-2), 60 nm is obtained.

In addition, the optical admittance $Y_2$ obtained when the third dielectric layer 23 made of $Y_2O_3$ having a refractive index $N_3$ of 1.85 and a film thickness of ¼ wavelength is formed on the glass substrate 11 having a refractive index of 1.51, and on the third dielectric layer 23, the second dielectric layer 22 made of $MgF_2$ having a refractive index $N_2$ of 1.38 and a film thickness of ¼ wavelength is further formed, that is, the optical admittance $Y_2$ obtained from a laminated structure composed of the glass substrate 11, the third dielectric layer 23 having an optical thickness of λ/4, and the second dielectric layer 22 having an optical thickness of λ/4, can be obtained from the equation (4), and $Y_2$ is 0.84.

This optical admittance $Y_2$ is approximately equivalent to the optical admittance $Y_1$. Accordingly, when the refractive index $N_2$ and the film thickness of the second dielectric layer 22 are set to 1.38 and ¼ wavelength, respectively, and the refractive index $N_3$ and the film thickness of the third dielectric layer 23 are set to 1.85 and ¼ wavelength, respectively, the optical admittance of the three-layered antireflection film provided on the metal film 30 is close to the optical admittance of the glass substrate 11, and hence the reflectance at the interface between the metal film 30 and the glass substrate 11 can be minimized.

The results described above are summarized in Table 6.

Embodiment 4

Embodiment 4 is also a modification of Embodiment 1. In Embodiment 4, as is the case of Embodiment 1, the metal film 30 was formed from molybdenum (Mo), and the second dielectric layer 22 was formed from $SiO_x$. In this case, $n_M = 3.53 \pm 0.10$, $k_M = 3.30 \pm 0.10$, $N_G = 1.51 \pm 0.10$, and $N_2 = 1.46 \pm 0.10$ hold, and $4.46 \leq N_1 + N_3 \leq 4.52$ holds. In addition, $7.08 \leq n_M + N_1 + N_3 \leq 8.28$ holds.

Furthermore, in Embodiment 4, the first dielectric layer 21 was formed from niobium pentaoxide ($Nb_2O_5$) or cerium oxide ($CeO_2$) having a film thickness of ¼ wavelength. In addition, the second dielectric layer 22 was formed from $SiO_x$ having a film thickness of ¼ wavelength, and the third dielectric layer 23 was formed from a titanium dioxide ($TiO_2$) having a film thickness of ¼ wavelength. In this case, $N_1$ is 2.2, $N_2$ is 1.46, and $N_3$ is 2.4.

Accordingly, the center O $(x_0, y_0)$, the origin A $(x_A, y_A)$, the radius r, and the equation of the optical admittance locus circle of the laminated structure composed of the metal film 30 made of molybdenum and the first dielectric layer 21 formed thereon having an optional thickness are as follows.

$x_0=(3.53^2+3.3^2+2.2^2)/(2\times3.53)=3.99$ $y_0=0$ $x_A=3.53$ $y_A=-3.3$ $r=3.33$ $(x-3.99)^2+y^2=3.33^2$ In addition, this optical admittance locus circle intersects the real axis (x axis) at a point B (0.66,0). In this case, the point B gives a minimum reflectance. The optical admittance $Y_1$ obtained from the equation (3) is 0.66. In addition, when the minimum film thickness $d_{min}$ of the first dielectric layer 21, which gives the minimum reflectance, is calculated from the equations (7-1) and (7-2), 72 nm is obtained.

In addition, the optical admittance $Y_2$ obtained when the third dielectric layer 23 made of $Nb_2O_5$ or $CeO_2$ having a refractive index $N_3$ of 2.2 and a film thickness of ¼ wavelength is formed on the glass substrate 11 having a refractive index of 1.51, and on the third dielectric layer 23, the second dielectric layer 22 made of $SiO_x$ having a refractive index $N_2$ of 1.46 and a film thickness of ¼ wavelength is further formed, that is, the optical admittance $Y_2$ obtained from a laminated structure composed of the glass substrate 11, the third dielectric layer 23 having an optical thickness of $\lambda/4$, and the second dielectric layer 22 having an optical thickness of $\lambda/4$, can be obtained from the equation (4), and $Y_2$ is 0.67.

This optical admittance $Y_2$ is approximately equivalent to the optical admittance $Y_1$. Accordingly, when the refractive index $N_2$ and the film-thickness of the second dielectric layer 22 are set to 1.46 and ¼ wavelength, respectively, and the refractive index $N_3$ and the film thickness of the third dielectric layer 23 are set to 2.2 and ¼ wavelength, respectively, the optical admittance of the three-layered antireflection film provided on the metal film 30 is close to the optical admittance of the glass substrate 11, and hence the reflectance at the interface between the metal film 30 and the glass substrate 11 can be minimized.

The results described above are summarized in Table 6.

TABLE 3

$\lambda = 808$ nm

|  |  | Embodiment 1-1 |  | Film thickness (nm) | Embodiment 1-2 | Film thickness (nm) |
|---|---|---|---|---|---|---|
| Metal film | $n_M$ | Mo | 3.53 |  | Mo | 3.53 |  |
|  | $k_M$ |  | 3.30 |  |  | 3.30 |  |
| First dielectric layer | $N_1$ | $TiO_2$ | 2.40 | 65 | $Nb_2O_5$, $CeO_2$ | 2.20 | 72 |
| Second dielectric layer | $N_2$ | $MgF_2$ | 1.38 | 146 | $MgF_2$ | 1.38 | 146 |
| Third dielectric layer | $N_3$ | $SiO_x$ | 1.90 | 106 | $Ta_2O_5$, $ZrO_2$ | 2.10 | 96 |
| Glass substrate | $N_G$ |  | 1.51 |  |  | 1.51 |  |
| Optical admittance locus circle |  |  |  |  |  |  |
| X coordinate of center O |  |  | 4.12 |  | 3.99 |  |
| Radius r |  |  | 3.35 |  | 3.33 |  |
| Intersection with x axis |  |  | 0.77 |  | 0.66 |  |
| Optical admittance $Y_1$ |  |  | 0.77 |  | 0.66 |  |
| Optical admittance $Y_2$ |  |  | 0.80 |  | 0.65 |  |
| $N_1 + N_3$ |  |  | 4.30 |  | 4.30 |  |
| $n_M + N_1 + N_3$ |  |  | 7.83 |  | 7.83 |  |
| $\delta_{min}$ |  |  | 1.20 |  | 1.24 |  |
| $d_{min}$ |  |  | 65 |  | 72 |  |

TABLE 4

$\lambda = 808$ nm

|  |  | Embodiment 1-3 |  | Film thickness (nm) | Embodiment 1-4 |  | Film thickness (nm) |
|---|---|---|---|---|---|---|---|
| Metal film | $n_M$ | Mo | 3.53 |  | Mo | 3.53 |  |
|  | $k_M$ |  | 3.30 |  |  | 3.30 |  |
| First dielectric layer | $N_1$ | $Ta_2O_5$, $ZrO_2$ | 2.10 | 77 | $HfO_2$ | 1.98 | 83 |
| Second dielectric layer | $N_2$ | $MgF_2$ | 1.38 | 146 | $MgF_2$ | 1.38 | 146 |
| Third dielectric layer | $N_3$ | $Nb_2O_5$, $CeO_2$ | 2.20 | 92 | ZrS | 2.30 | 88 |
| Glass substrate | $N_G$ |  | 1.51 |  |  | 1.51 |  |
| Optical admittance locus circle |  |  |  |  |  |  |  |
| X coordinate of center O |  |  | 3.93 |  |  | 3.86 |  |
| Radius r |  |  | 3.32 |  |  | 3.32 |  |
| Intersection with x axis |  |  | 0.61 |  |  | 0.55 |  |
| Optical admittance $Y_1$ |  |  | 0.61 |  |  | 0.55 |  |
| Optical admittance $Y_2$ |  |  | 0.59 |  |  | 0.54 |  |

TABLE 4-continued $\lambda = 808$ nm

| | | |
|---|---|---|
| $N_1 + N_3$ | 4.30 | 4.28 |
| $n_M + N_1 + N_3$ | 7.83 | 7.81 |
| $\delta_{min}$ | 1.25 | 1.27 |
| $d_{min}$ | 77 | 83 |

TABLE 5

$\lambda = 808$ nm

| | | | Embodiment 2-1 | Film thickness (nm) | Embodiment 2-2 | Film thickness (nm) |
|---|---|---|---|---|---|---|
| Metal film | $n_M$ | Cr | 3.18 | | Cr | 3.18 | |
| | $k_M$ | | 4.41 | | | 4.41 | |
| First dielectric layer | $N_1$ | $TiO_2$ | 2.40 | 65 | ZnS | 2.30 | 68 |
| Second dielectric layer | $N_2$ | $MgF_2$ | 1.38 | 146 | $MgF_2$ | 1.38 | 146 |
| Third dielectric layer | $N_3$ | ZnS | 2.30 | 88 | $TiO_2$ | 2.40 | 84 |
| Glass substrate | $N_G$ | | 1.51 | | | 1.51 | |

| Optical admittance locus circle | | |
|---|---|---|
| X coordinate of center O | 5.55 | 5.48 |
| Radius r | 5.01 | 4.97 |
| Intersection with x axis | 0.55 | 0.51 |
| Optical admittance $Y_1$ | 0.55 | 0.51 |
| Optical admittance $Y_2$ | 0.54 | 0.50 |
| $N_1 + N_3$ | 4.70 | 4.70 |
| $n_M + N_1 + N_3$ | 7.88 | 7.88 |
| $\delta_{min}$ | 1.21 | 1.22 |
| $d_{min}$ | 65 | 68 |

TABLE 6

$\lambda = 808$ nm

| | | | Embodiment 3 | Film thickness (nm) | Embodiment 4 | Film thickness (nm) |
|---|---|---|---|---|---|---|
| Metal film | $n_M$ | Ni alloy | 2.94 | | Mo | 3.53 | |
| | $k_M$ | | 2.92 | | | 3.30 | |
| First dielectric layer | $N_1$ | $TiO_2$ | 2.40 | 60 | $Nb_2O_5$, $CeO_2$ | 2.20 | 72 |
| Second dielectric layer | $N_2$ | $MgF_2$ | 1.38 | 146 | $SiO_x$ | 1.46 | 138 |
| Third dielectric layer | $N_3$ | $Y_2O_3$ | 1.85 | 109 | $Nb_2O_5$, $CeO_2$ | 2.20 | 92 |
| Glass substrate | $N_G$ | | 1.51 | | | 1.51 | |

| Optical admittance locus circle | | |
|---|---|---|
| X coordinate of center O | 3.90 | 3.99 |
| Radius r | 3.07 | 3.33 |
| Intersection with x axis | 0.83 | 0.66 |
| Optical admittance $Y_1$ | 0.83 | 0.66 |
| Optical admittance $Y_2$ | 0.84 | 0.67 |
| $N_1 + N_3$ | 4.25 | 4.40 |
| $n_M + N_1 + N_3$ | 7.19 | 7.93 |
| $\delta_{min}$ | 1.13 | 1.24 |
| $d_{min}$ | 60 | 72 |

Embodiment 5

Embodiment 5 is also a modification of Embodiment 1. Also in Embodiment 5, as is the case of Embodiment 1, the metal film 30 was formed from molybdenum (Mo), and the first dielectric layer 21, the second dielectric layer 22, and the third dielectric layer 23 were formed in the same manner as those of Embodiments 1-1, 1-2, 1-3, 1-4, 2-1, and 2-2.

In the structure described in Embodiment 1, approximately 4% of light (or laser light) incident on the glass substrate 11 is reflected by the surface thereof. In Embodiment 5, as shown in a schematic, partial cross-sectional view of FIG. 1B, a second antireflection film 40 is further formed on the surface of the glass substrate 11 opposite to the surface on which the third dielectric layer 23 is formed. The second antireflection film 40 has, in more particular, a two layered structure composed of a bottom layer 41 and a top layer 42 provided in that order from the glass substrate 11 side. In this case, the top layer 42 is formed of $MgF_2$ having a refractive index of 1.38, and the optical thickness thereof is $\lambda/4$ (=146 nm). In addition, the bottom layer 41 is formed of $SiO_xN_y$ having a refractive index of 1.7, and the optical thickness thereof is $\lambda/4$ (=119 nm).

Figure 3:
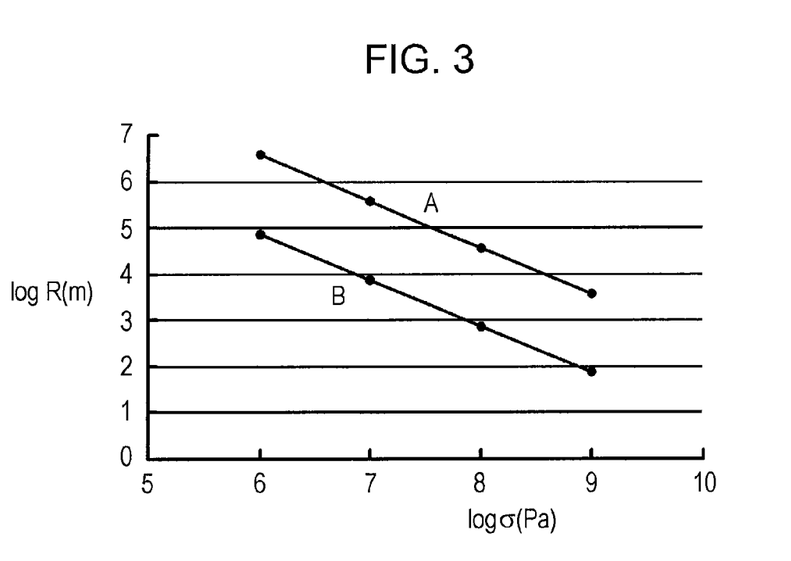
FIG. 3 is a graph showing the relationship among the thickness of a glass substrate, the stress of a metal film made of molybdenum having a thickness of 100 nm, and the curvature radius of the glass substrate.
Figure 4A:
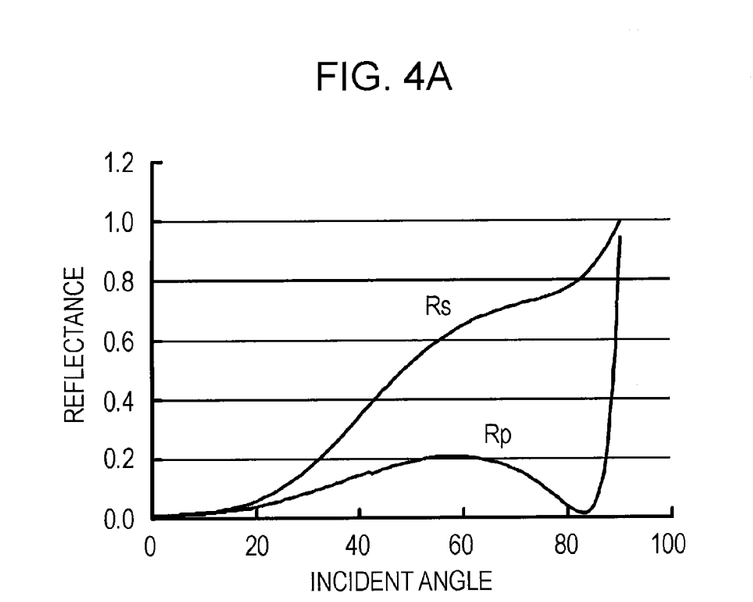
FIGS. 4A and 4B are graphs showing simulation results of reflectances (reflectance $R_p$ of a p-polarized component and reflectance $R_s$ of an s-polarized component), which are obtained when a second antireflection film is formed on an opposite side of a glass substrate forming a laminated structure described in Embodiments 1-1 and 1-2, respectively.
Figure 4B:
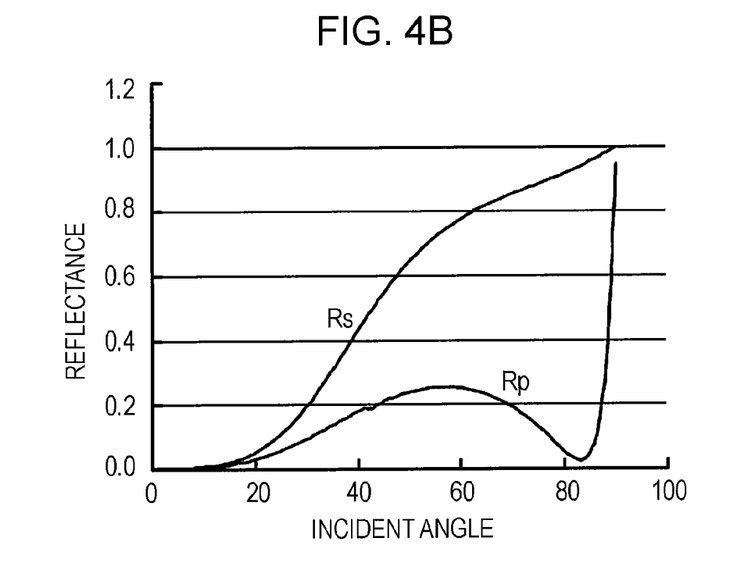
Figure 5A:
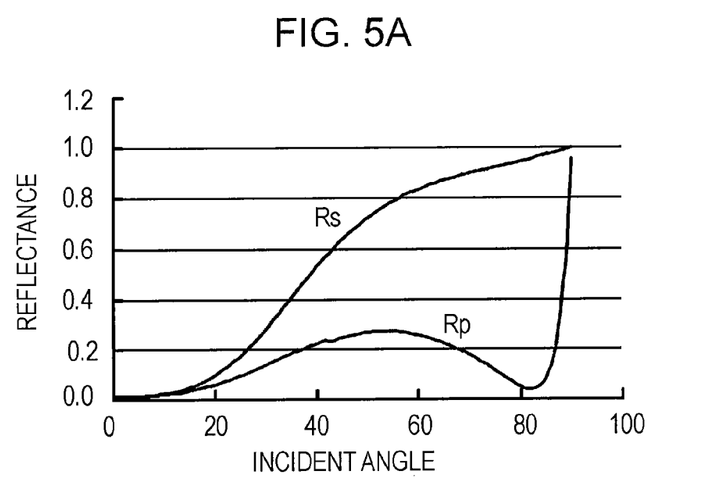
FIGS. 5A and 5B are graphs showing simulation results of reflectances (reflectance $R_p$ of a p-polarized component and reflectance $R_s$ of an s-polarized component), which are obtained when a second antireflection film is formed on an opposite side of a glass substrate forming a laminated structure described in Embodiments 1-3 and 1-4, respectively.
Figure 5B:
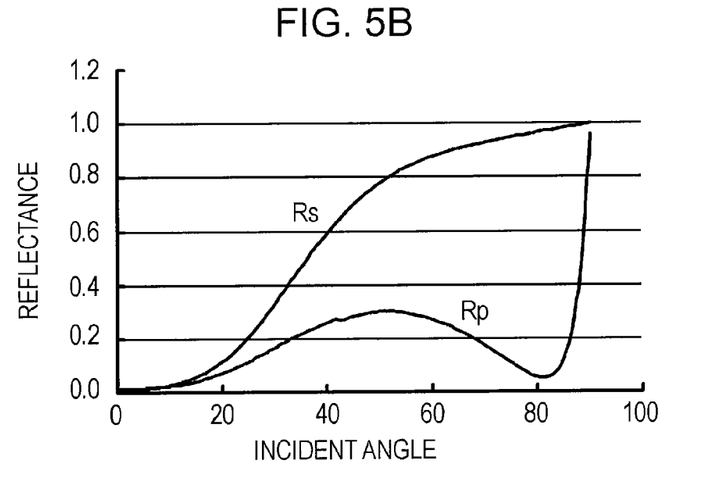
Figure 6A:
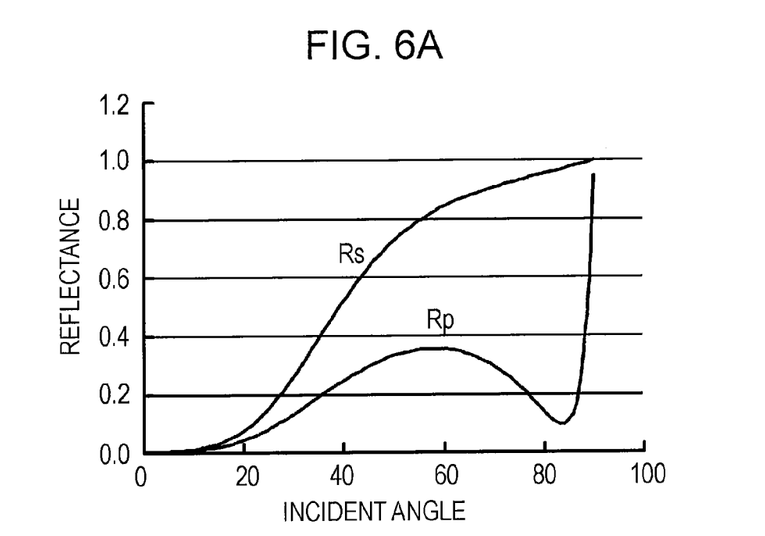
FIGS. 6A and 6B are graphs showing simulation results of reflectances (reflectance $R_p$ of a p-polarized component and reflectance $R_s$ of an s-polarized component), which are obtained when a second antireflection film is formed on an opposite side of a glass substrate forming a laminated structure described in Embodiments 2-1 and 2-2, respectively.
Figure 6B:
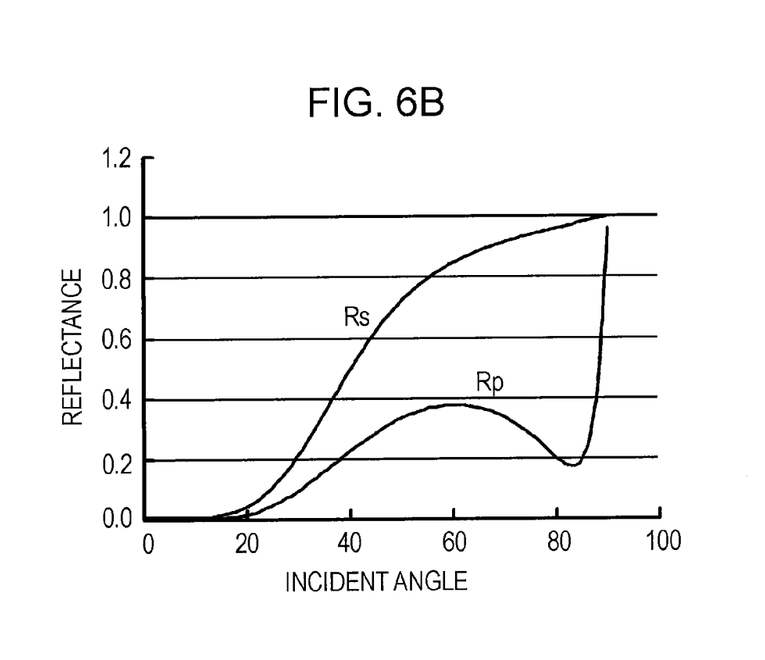

By the formation of the second antireflection film 40 as described above, in addition to the decrease in reflection of light (or laser light) incident on the glass substrate 11 at the surface thereof, since the two sides of the glass substrate 11 are covered, the film stresses are balanced; hence, the warpage of the glass substrate 11, which is caused by a film stress generated when only one surface of the glass substrate 11 is covered, can be reduced. In general, the film stress of a metal film is larger than that of a dielectric layer. When the curvature diameter of the warped glass substrate 11 is calculated based on the Stoney formula represented by the following equations (8-1) and (8-2), the results are obtained as shown in FIG. 3. The horizontal axis in FIG. 3 represents the stress ($\sigma$) in logarithm of a metal film made of molybdenum having a thickness of 100 nm, and the vertical axis in FIG. 3 represents the curvature radius (R) in logarithm of the glass substrate 11. In addition, in FIG. 3, "A" indicates the case in which the glass substrate 11 has a thickness of 5 mm, and "B" indicates the case in which the glass substrate 11 has a thickness of 0.7 mm. Although also depending on film-forming conditions, the stress of the metal film 30 of molybdenum formed by a sputtering method is within the range of $-5 \times 10^8$ to $1 \times 10^9$ Pa. When the stress $\sigma$ is assumed to be $1 \times 10^9$ Pa (1 GPa), and when the glass substrate 11 has a thickness of 0.7 mm (see "B" in FIG. 3), the curvature radius is approximately 100 m. Although the curvature radius is large as described above, when the dimension of the glass substrate 11 is large, the amount of deformation of the glass substrate 11 at the center thereof becomes on the order of millimeters. Accordingly, when the metal film 30 has a large film stress, the thickness of the glass substrate 11 is preferably increased. In this case, the curvature radius of the glass substrate 11 of the laminated structure composed of the second antireflection film 40, the glass substrate 11, the third dielectric layer 23, the second dielectric layer 22, the first dielectric layer 21, and the metal film 30 is preferably $1.0 \times 10^5$ m or more.

$$\sigma = \{(M_s \times h_s^2)/(6 \times h_f)\} \times K \quad (8\text{-}1)$$

$$Ms = E/(1-\gamma) \quad (8\text{-}2)$$

In the above formulas, $h_s$ indicates the thickness of the substrate, $h_f$ indicates the film thickness, $M_s$ indicates the biaxial modulus, E indicates Young's modulus of the substrate, and $\gamma$ indicates the Poisson ratio.

On one side of the glass substrate 11, four layers including the metal film 30 are formed, and on the other side, two layers are formed; however, in order to more strictly obtain the balance between the film stresses, on the other side of the glass substrate 11, two thin layers (dummy films) may further be formed. In this case, a dummy film having an optical thickness of integral multiple of $\lambda/2$ is preferably formed, for example, on the top layer.

The simulation results of reflectances (reflectance $R_p$ of a p-polarized component and reflectance $R_s$ of an s-polarized component), which are obtained when the second antireflection film 40 is formed on the opposite surface of the glass substrate 11 forming the laminated structure 10 of Embodiments 1-1, 1-2, 1-3, 1-4, 2-1, and 2-2, are shown in FIGS. 4A, 4B, 5A, 5B, 6A, and 6B, respectively. In all these six embodiments described above, the interface reflectance is 1% or less.

It should be appreciated that although the materials for the glass substrate, the three-layered antireflection film, and the metal film are described by way of example, they may be optionally changed.

The optical admittance $Y_2$ obtained from a laminated structure (hereinafter referred to as a "laminated structure A") composed of the glass substrate 11 having a refractive index $N_G$ of 1.51, the third dielectric layer 23 made of $TiO_2$ and having a refractive index $N_3$ of 2.4 and a film thickness of $\frac{1}{4}$ wavelength, and the second dielectric layer 22 made of $MgF_2$ and having a refractive index $N_2$ of 1.38 and a film thickness of $\frac{1}{4}$ wavelength is 0.5. Hence, when it is assumed that "0.5" is the lower limit of the optical admittance $Y_2$, in this case, the lower limit of the optical admittance $Y_1$ is also 0.5. Accordingly, the optical admittance locus circle can be represented by the following equation (9-1), and when $x_0=0.5$ and $y_0=0$ are substituted in the equation (9-1), the following equation (9-2) can be obtained.

$$x_0^2 + y_0^2 - x_0\{(n_M^2 + k_M^2 + N_1^2)/n_M\} + N_1^2 = 0 \quad (9\text{-}1)$$

$$(n_M - 6.01)^2 + k_M^2 = 5.51^2 \quad (9\text{-}2)$$

The results of comparison between $5.51^2$ and the value (called a "calculated value A") obtained when $n_M$ and $k_M$ of the complex refractive index of a material forming the metal film are substituted in the left-hand side of the equation (9-2) are shown in the following Table 7. As described above, in the case in which the lower limit of the optical admittance $Y_2$ is assumed to be 0.5, when a metal material is selected so that "the calculated value A-$5.51^2$" is negative, it is possible to make the optical admittance $Y_1$ coincide with the optical admittance $Y_2$.

TABLE 7

| Metal material | $n_M$ | $k_M$ | Calculated value A | Calculated value A − $5.51^2$ |
|---|---|---|---|---|
| AG | 0.12 | 3.45 | 46.59 | 16 |
| Al | 1.02 | 2.92 | 33.43 | 3 |
| Au | 0.31 | 2.88 | 40.78 | 10 |
| Cu | 0.83 | 2.60 | 33.59 | 3 |
| Rb | 2.00 | 5.11 | 42.19 | 12 |
| Ni | 1.80 | 3.33 | 28.81 | −2 |
| Mo | 3.53 | 3.30 | 17.04 | −13 |
| Cr | 3.18 | 4.41 | 27.46 | −3 |
| W | 2.76 | 1.00 | 11.56 | −19 |
| Inconel | 2.94 | 2.92 | 17.95 | −12 |

Film-forming methods for forming the first dielectric layer 21, the second dielectric layer 22, the third dielectric layer 23, and the metal film 30 may be optionally determined in consideration of materials forming these layers and the film, desired refractive indices thereof, and the like. As the film-forming methods, for example, there may be mentioned various wet film-forming methods, such as a plating method, a solution precipitation method, an anodic oxidation method, a sol-gel method, and a Langmuir method; various chemical vapor deposition methods (CVD methods), such as an atmospheric CVD method, a reduced-pressure CVD method, a thermal CVD method, a plasma enhanced CVD (PECVD) method, a laser CVD method, a photo assisted CVD method, an ECR-CVD method, and a MOCVD method; and various physical vapor deposition methods (PVD methods), such as a thermal evaporation deposition method, a plasma sputtering method, an ion beam sputtering method, an ion plating method, and ion vapor deposition method (IVD method). As the thermal evaporation deposition method, for example, there may be mentioned a resistance heating method, an electron beam heating method, a laser heating method, an arc discharge method, a high-frequency heating method, a flash deposition method, and a molecular beam epitaxial (MBE) method. In addition, as the plasma sputtering method, for example, a parallel plate sputtering method, a direct-current sputtering method, a high-frequency sputtering method, a double cathode sputtering method, a direct-current magnetron sputtering method, and a magnetron sputtering method. Furthermore, as the ion plating method, for example, there may be mentioned a direct current (DC) method, an RF method, a multi-cathode method, an activated reactive method, a hollow cathode discharge (HCD) method, an electric field deposition method, a high-frequency ion plating method, and a reactive ion plating method. In addition, as the method for measuring the refractive indices of the first dielectric layer 21, the second dielectric layer 22, the third dielectric layer 23, and the metal film 30, for example, a polarization analysis using a spectroscopic ellipsometer may be mentioned.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An antireflection film provided between a metal film having a complex refractive index represented by $N_M = n_M - i \cdot k_m$ and a glass substrate having a refractive index $N_G$, wherein the metal film is an exposed surface of the antireflection film and includes a metal film component selected from the group consisting of molybdenum and a nickel alloy, comprising, from the metal film side:
   (A) a first dielectric layer having a refractive index $N_1$;
   (B) a second dielectric layer provided on the first dielectric layer and having a refractive index $N_2$; and
   (C) a third dielectric layer provided on the second dielectric layer and having a refractive index $N_3$,
   wherein $N_1 < n_M$, $N_1 > N_G$, $N_2 < N_G$, and $N_3 > N_G$ hold, whereby light which is incident on the glass substrate and which reaches the metal film is prevented from being reflected by the metal film, and
   wherein $4.29 \leq N_1 + N_3 \leq 4.75$ holds.

2. The antireflection film according to claim 1, wherein $1.51 < N_1 < 3.53$ holds.

3. The antireflection film according to claim 1, wherein, when a wavelength of the incident light is represented by $\lambda$, an optical admittance $Y_1$ obtained when the first dielectric layer has a minimum thickness at which a reflectance of a laminated structure of the metal film and the first dielectric layer is minimized and an optical admittance $Y_2$ obtained from a laminated structure of the glass substrate, the third dielectric layer having an optical thickness of $\lambda/4$, and the second dielectric layer having an optical thickness of $\lambda/4$ satisfy the following equation $$|Y_1 - Y_2|/\alpha \leq 0.04$$

where $\alpha \equiv (n_M^2 + k_M^2 + N_1^2)/(2 \times n_M)$ holds.

4. The antireflection film according to claim 3, wherein the optical admittances $Y_1$ and $Y_2$ are represented by the following equations:

$$Y_1 = \alpha - \{(n_M - \alpha)^2 + k_M^2\}^{1/2} \text{ and } Y_2 = (N_G \times N_2^2)/N_3^2,$$
respectively.

5. The antireflection film according to claim 1, wherein the metal film component includes molybdenum,
the second dielectric layer includes $MgF_2$,
$n_M = 3.53 \pm 0.10$, $k_M = 3.30 \pm 0.10$, $N_G = 1.51 \pm 0.10$, and $N_2 = 1.38 \pm 0.10$ hold, and $4.29 \leq N_1 + N_3 \leq 4.40$ holds.

6. The antireflection film according to claim 5, wherein the combination, between a material forming the first dielectric layer and a material forming the third dielectric layer, is $(TiO_2, SiO_x)$, $(Nb_2O_5, Ta_2O_5)$, $(Nb_2O_5, ZrO_2)$, $(CeO_2, Ta_2O_5)$, $(CeO_2, ZrO_2)$, $(Ta_2O_5, Nb_2O_5)$, $(Ta_2O_5, CeO_2)$, $(ZrO_2, Nb_2O_5)$ or $(ZrO_2, CeO_2)$.

7. The antireflection film according to claim 1, wherein the metal film component includes molybdenum,
the second dielectric layer includes $SiO_x$,
$n_M = 3.53 \pm 0.10$, $k_M = 3.30 \pm 0.10$, $N_G = 1.51 \pm 0.10$, and $N_2 = 1.46 \pm 0.10$ hold, and $4.4 \leq N_1 + N_3 \leq 4.6$ holds.

8. The antireflection film according to claim 7, wherein the combination, between a material forming the first dielectric layer and a material forming the third dielectric layer, is $(Nb_2O_5, Nb_2O_5)$, $(Nb_2O_5, CeO_2)$, $(CeO_2, CeO_2)$, or $(CeO_2, Nb_2O_5)$.

9. The antireflection film according to claim 1, wherein $7.08 \leq n_M + N_1 + N_3 \leq 8.28$ holds.

10. The antireflection film according to claim 1, further comprising a second antireflection film on a surface of the glass substrate opposite to that on which the third dielectric layer is provided.

11. The antireflection film according to claim 10, wherein the glass substrate of a laminated structure composed of the second antireflection film, the glass substrate, the third dielectric layer, the second dielectric layer, the first dielectric layer, and the metal film has a curvature radius of $1.0 \times 10^5$ m or more.

12. An antireflection film provided between a metal film having a complex refractive index represented by $N_M = n_M - i \cdot k_m$ and a glass substrate having a refractive index $N_G$, wherein the metal film is an exposed surface of the antireflection film and includes a metal film component selected from the group consisting of molybdenum and a nickel alloy, comprising, from the metal film side:
   (A) a first dielectric layer having a refractive index $N_1$;
   (B) a second dielectric layer provided on the first dielectric layer and having a refractive index $N_2$; and
   (C) a third dielectric layer provided on the second dielectric layer and having a refractive index $N_3$,
   wherein $N_1 < n_M$, $N_1 > N_G$, $N_2 < N_G$, and $N_3 > N_G$ hold, whereby light which is incident on the glass substrate and which reaches the metal film is prevented from being reflected by the metal film,
   wherein the second dielectric layer includes $MgF_2$,
   wherein $n_M = 2.94 \pm 0.10$, $k_M = 2.92 \pm 0.10$, $N_G = 1.51 \pm 0.10$, and $N_2 = 1.38 \pm 0.10$ hold,
   wherein $4.14 \leq N_1 + N_3 \leq 4.25$ holds, and
   wherein the combination, between a material forming the first dielectric layer and a material forming the third dielectric layer, is $(TiO_2, Y_2O_3)$.

* * * * *